United States Patent Office 3,026,285
Patented Mar. 20, 1962

3,026,285
CURING AGENT COMPRISING THE REACTION PRODUCT OF AN ALIPHATIC POLYAMINE AND AN ALDEHYDE, AND EPOXY RESIN CURED THEREWITH
Frank N. Hirosawa, 2839 Blanchard St., Los Angeles, Calif., and John Delmonte, 1637 Don Carlos Ave., Glendale, Calif.
No Drawing. Filed Sept. 18, 1959, Ser. No. 840,788
14 Claims. (Cl. 260—45.2)

This invention relates to curing agents for epoxy resins and in particular to curing agents which are non-irritating to the skin of persons handling the resin mixtures.

The low temperature curing agents presently used in hardening 2,2 bis (4-hydroxyphenyl) propane-epichlorohydrin epoxy resins, including the alipathic polyamines and adducts containing polyamines, are primary irritants and cause skin irritation and subsequent sensitization of persons handling the materials. In consequence, elaborate precautions have been required in the handling of epoxy resins and in particular the low (room) temperature curing agents therefor.

We have discovered that a substantially non-irritating curing agent is produced by pre-reacting a mixture of polyamine and an aldehyde, by which there is formed a complex of undetermined structure. Water is liberated in this reaction, and there is a small increase in viscosity under the reacting conditions used. This amine-aldehyde complex not only is non-irritating in its effect upon humans handling it, but also it has superior hardening properties in epoxy resin compositions. We have further discovered that the viscosity of our curing agent may be controlled by the subsequent reaction of the amine aldehyde complex with an aliphatic acid or acid anhydride. The acid anhydrides are preferred because less water is evolved in the reaction, and therefore there is less water to be removed in processing the curing agent. The acid or acid anhydride also improves the chemical and water resistance of the curing agent as well as the cured epoxy resin products, as compared to polyamine curing agents and polyamine cured epoxy resins.

The non-irritant nature of our hardener product was determined not only by the practical test of using the material, observing that without taking the usual precautions, no cases of skin irritation were encountered among the workmen using it, but also the material has been certified as non-irritating by a recognized dermatological laboratory.

EXAMPLE 1

Two mols of triethylenetetramine and one mol of paraformaldehyde were reacted to produce an amine-aldehyde complex. The polyamine was heated to 70° C. in a flask, with continuous agitation, the flask being equipped with a vacuum take-off, so that the water formed in the reaction may be removed. The paraformaldehyde was then added slowly, maintaining the temperature at about 120° C. for about one-half hour. Upon cooling, the product had a viscosity of 71 centipoises and was non-irritating and had good hardening properties for epoxy resins.

EXAMPLE 2

When equal mol proportions of triethylenetetramine and paraformaldehyde were reacted as in Example 1, a non-irritating hardening product having a viscosity of 205 centipoises was produced.

EXAMPLE 3

When the proportions of triethylenetetramine and paraformaldehyde were 4 mols amine to 3 mols of aldehyde, the non-irritating hardener reaction product has a viscosity of 105 centipoises.

EXAMPLE 4

When 2 mols of diethylenetriamine were substituted for the amine of Example 1, a similar non-irritant epoxy hardener product was obtained having a viscosity of 50 centipoises.

EXAMPLE 5

When 2 mols of tetraethylenepentamine were substituted for the amine of Example 1, a similar product was obtained having a viscosity of 115 centipoises.

EXAMPLE 6

When furfuraldehyde was substituted for the formaldehyde in Example 2, and the ingredients reacted, a non-irritant hardener product having a viscosity of 280 centipoises at 25° F. was produced.

Other polyamines which have been successfully used in reactions forming our non-irritant hardener similar to those of Examples 1 to 5 are ethylene diamine; hydrazine; 1,3- and 1,2-propanediamine; 1,4-butanediamine; trimethylenediamine; tetramethylenediamine; diethylenetriamine; triethylene tetramine; tetraethylenepentamine; 3,3'-iminobisproplyamine; 3,3'-(methylimino)bispropylamine; 3-isopropylaminopropylamine; dimethylaminopropylamine; diethylaminopropylamine; ethylenebisoxypropylamine; methanediamine; and metaxylenediamine.

While paraformaldehyde is the most convenient and preferred aldehyde material for use in making the amine-aldehyde complex, other aldehydes such as formaldehyde (formalin or paraformaldehyde), acetaldehyde (paraldehyde), propionaldehyde, butyraldehyde, furfural, benzaldehyde, glyoxal, pyruvic aldehyde, crotonaldehyde, acrolein, and methylacrolein may be used in forming non-irritant amine-aldehyde complexes for use as epoxy resin hardeners.

The ratio of amine to aldehyde is selected so that at least one active hydrogen of each amine will be reacted with the aldehyde; that is, no free amines must be present in which none of their hydrogens have been reacted, either with aldehyde or an acid anhydride. The preferred ratio is in the range of two mols of polyamine to one mol of aldehyde, and one mol of polyamine to two mols of aldehyde.

As further disclosed below, when an acid anhydride is also employed, some "free" amine hydrogens may be reacted with an acid or anhydride; for example, three mols of polyamine may be reacted with one mol of paraformaldehyde, and this reaction product further reacted as to one free mol of polyamine with an acid or acid anhydride. Thus, in every molecule of amine at least one active hydrogen of at least one terminal amino group must be reacted.

The viscosities of the amine-aldehyde complex compositions formed as in the above illustrative examples may be controlled by further reacting the complexes with carboxylic acids or acid anhydrides. The ratio of anhydride or acid to amine-aldehyde product is selected to give the desired viscosity while avoiding tying up all of the potentially available reactive hydrogen groups which should be available to initiate the curing reaction when the hardener is subsequently used with the epoxy resin. See Examples 7 to 16.

EXAMPLE 7

The amine-aldehyde complex as formed by the steps disclosed in Example 1 may be further improved by reacting it with a carboxylic acid or the anhydride of the acid. After the mixture of aldehyde and amine had been heated for about one-half hour or until all of the formaldehyde had reacted, about 0.75 mol of hexahydrophthalic acid was added slowly, maintaining the temperature at about 150° C. This was continued for about one-half hour, using a reduced pressure on the reaction vessel of about 100 mm. mercury to remove the water formed. A water-free product having a viscosity of 4600 centipoises (measured at 25° C.) was produced.

EXAMPLE 8

Proceeding in a similar way to Example 7, an amine-aldehyde-anhydride composition consisting of the reaction product of 8 mols of triethylenetetramine and 4 mols of paraformaldehyde, followed by the subsequent reaction with one mol of dodecenyl succinic anhydride gave a non-irritating hardener composition having a viscosity of 200 centipoises.

EXAMPLE 9

Proceeding in a similar way to Example 7, an amine-aldehyde-anhydride composition consisting of the reaction product of 5 mols of tetraethylene pentamine and 4.5 mols of paraformaldehyde, followed by the subsequent reaction with 0.25 mol of hexahydrophthalic anhydride, yielded a non-irritant hardener composition having a viscosity of 2000 centipoises at 25° C.

EXAMPLE 10

Proceeding as in Example 7, the reaction product of 4 mols of tetraethylenepentamine and 2 mols of paraformaldehyde, followed by the subsequent reaction with one mol of hexahydrophthalic anhydride, yielded a non-irritant hardener composition having a viscosity of 15,000 centipoises at 25° C.

EXAMPLE 11

Proceeding as in Example 7, the reaction product of 6 mols of diethylenetriamine, and 3 mols of formaldehyde, followed by the subsequent reaction of 1 mol of acetic anhydride, yielded a low viscosity, non-irritant, effective curing agent for epoxy resins.

EXAMPLE 12

Proceeding as in Example 7, the reaction product of 6 mols of triethylenetetramine and 5 mols of paraformaldehyde, followed by the subsequent reaction with one mol of liquid dimer acid ("Empol" 1022) yielded a non-irritant viscous curing agent which cures an epoxy resin in about 30 minutes.

EXAMPLES 13–16

Proceeding as in Example 1 to prepare an amine-aldehyde complex by heating the ingredients in a flask as described, and subsequently reacting the resulting amine-aldehyde complex by slowly adding an acid or acid anhydride, and removing the water of reaction, for example by applying reduced pressure to the flask, a series of hardeners was formed having varying proportions of the acid constituent as shown in Table I below.

Table I

| Example No. | 13 | 14 | 15 | 16 |
|---|---|---|---|---|
| Tetraethylene pentamine, mols | 1 | 1 | 1 | 1 |
| Paraformaldehyde, mols | 1 | 1 | 1 | 1 |
| Hexahydrophthalic Anhydride, mols | 0 | 0.25 | 0.5 | 1 |
| Viscosity, centipoises at 25° C. | 300 | 5,600 | 296,000 | Solid |

The above examples are illustrative of the control of viscosity by varying additions of the carboxylic acid constituent, other amine-formaldehyde and other acids and acid anhydrides having been found to give similar results. The term "carboxylic acid constituent" as used herein and in the claims includes the following acids: acetic, propionic, butyric, valeric, caproic, heptyric, ethylhexoic, oleic, stearic, dimer acid (Emery Industries), trimer acid (Emery Industries), oxalic, succinic, maleic, itaconic, phthalic, tetrahydrophthalic, hexahydrophthalic, nadic, methyl nadic, and hexachlorobicycloheptenedicarboxylic; and acid anhydrides: acetic, propionic, butyric, succinic, maleic, itaconic, phthalic, tetrahydrophthalic, hexahydrophthalic, nadic, methyl nadic, and hexachlorobicycloheptenedicarboxylic, and equivalents thereof.

When used to cure epoxy resins, substantially stoichiometric proportions of hardener to epoxy are employed, following the usual practice.

EXAMPLE 17

One hundred parts by weight of an active 2,2 bis (4-hydroxyphenyl) propane-epichlorohydrin epoxy resin having an epoxy equivalent of 200 were mixed with 200 parts by weight of the hardener prepared as described in Example 7. The gelling time at 25° C. was 30 minutes, and the composition was hardened completely in the usual manner.

While specific examples of non-irritant epoxy hardeners have been given by way of illustration, it will be understood that many other combinations of equivalent ingredients may be reacted to give non-irritant hardening agents for epoxy resins, within the scope of the appended claims.

We claim:
1. A non-irritant hardening agent adapted for curing 2,2-bis (4-hydroxyphenyl) propane-epichlorohydrin epoxy resin compositions consisting essentially of the substantially anhydrous liquid reaction product of an aliphatic polyamine compound and an aldehyde, the ratio of amine to aldehyde being selected to retain a substantial proportion of reactive hydrogen in the product.

2. A non-irritant hardening agent adapted for curing epoxy resin compositions consisting essentially of the substantially anhydrous liquid reaction product of two mols of an aliphatic polyamine compound and at least one mol of an aldehyde.

3. A non-irritant hardening agent adapted for curing 2,2-bis (4-hydroxyphenyl) propane-epichlorohydrin epoxy resin compositions consisting essentially of the co-reacted substantially anhydrous mixture of the liquid reaction product of an aliphatic polyamine with an aldehyde, and an acid constituent selected from the group consisting of aliphatic carboxylic acids, aromatic carboxylic acids, anhydrides of aliphatic carboxylic acids, and anhydrides of aromatic carboxylic acids; the ratio of acid anhydride or acid to the liquid reaction product being selected to retain a substantial proportion of reactive hydrogen in the hardening agent.

4. A non-irritant hardening agent adapted for curing 2,2 - bis (4 - hydroxyphenyl) propane - epichlorohydrin epoxy resin compositions consisting essentially of the co-reacted substantially anhydrous mixture of the liquid reaction product of two mols of an aliphatic polyamine with at least one mole of an aldehyde, and an acid constituent selected from the group consisting of aliphatic carboxylic acids, aromatic carboxylic acids, anhydrides of aliphatic carboxylic acids, and anhydrides of aromatic carboxylic acids, the ratio of the acid constituent to the amine-aldehyde reaction product being selected to produce a hardener agent of the desired viscosity and retained reactive hydrogen.

5. The hardening agent as defined in claim 2, in which the aldehyde is paraformaldehyde.

6. The hardening agent as defined in claim 2, in which the aldehyde is furfuraldehyde.

7. The hardening agent as defined in claim 2 in which the aldehyde is paraformaldehyde and the polyamine is selected from the group consisting of ethylene diamine; hydrazine; 1,3-propanediamine; 1,2-propanediamine; 1,4-butanediamine; trimethylenediamine; tetramethylenediamine; diethylenetriamine; triethylene tetramine; tetraethylenepentamine; 3,3'-iminobispropylamine; 3,3' (methylimino) bispropylamine; 3-isopropylaminopropylamine; dimethylaminopropylamine; diethylaminopropylamine;

ethylenebisoxypropylamine; methanediamine; and metaxylenediamine.

8. The non-irritant hardening agent defined in claim 4 in which the carboxylic acid constituent is hexahydrophthalic anhydride.

9. The non-irritant hardening agent defined in claim 4 in which the carboxylic acid constituent is succinic anhydride.

10. The non-irritant hardening agent defined in claim 4 in which the carboxylic acid constituent is acetic anhydride.

11. The non-irritant hardening agent defined in claim 4 in which the carboxylic acid consituent is liquid dimer acid.

12. A hardened epoxy resin product consisting essentially of a 2,2-bis (4-hydroxyphenyl) propane-epichlorohydrin epoxy resin and a hardener consisting essentially of the substantially anhydrous liquid reaction product of one mol of an aliphatic polyamine and at least one mol of an aldehyde, the epoxy resin and the hardener being present in substantially stoichiometric proportions based upon the epoxy equivalent.

13. A hardened epoxy resin product consisting essentially of a 2,2-bis (4-hydroxyphenyl propane-epichlorohydrin epoxy resin, and a hardener consisting essentially of a co-reacted substantially anhydrous liquid reaction product of an aliphatic polyamine with an aldehyde, and a carboxylic acid constituent selected from the group consisting of aliphatic carboxylic acids, aromatic carboxylic acids, anhydrides of alphatic carboxylic acids, and anhydrides of aromatic carboxylic acids, the epoxy resin and the hardener being present in substantially stoichiometric proportions based upon the epoxy equivalent.

14. A non-irritant hardening agent adapted for curing 2,2-bis (4-hydroxyphenyl) propane-epichlorohydrin epoxy resin compositions consisting essentially of the substantially anhydrous liquid reaction product of tetraethylene pentamine and paraformaldehyde.

References Cited in the file of this patent
UNITED STATES PATENTS

| | | |
|---|---|---|
| 2,272,783 | Treboux | Feb. 10, 1942 |
| 2,511,913 | Greenlee | June 20, 1950 |